United States Patent
Jonsson (10) Patent No.: US 9,124,388 B2
(45) Date of Patent: Sep. 1, 2015

(54) CELLULAR COMMUNICATION SYSTEM COMPUTATION OF RSRP IN THE PRESENCE OF LARGE FREQUENCY ERRORS

(71) Applicant: ST-Ericsson SA, Plan-les-Ouates (CH)

(72) Inventor: Elias Jonsson, Malmo (SE)

(73) Assignee: ST-ERICSSON SA, Plan-les-Ouates (CH)

( * ) Notice: Subject to any disclaimer, the term of this patent is extended or adjusted under 35 U.S.C. 154(b) by 30 days.

(21) Appl. No.: 13/893,475

(22) Filed: May 14, 2013

(65) Prior Publication Data

US 2014/0341174 A1 Nov. 20, 2014

(51) Int. Cl.
H04L 5/00 (2006.01)

(52) U.S. Cl.
CPC .................................. *H04L 5/0007* (2013.01)

(58) Field of Classification Search
CPC .............. H04L 5/0007; H04L 27/2662; H04L 27/2675; H04L 43/028; H04L 47/27; H04W 92/20; H04W 74/0833; H04W 56/0045; H04W 8/00; H04W 24/08; H04W 48/124; H04B 7/024; H04B 7/0417; H04B 7/0639
See application file for complete search history.

(56) References Cited

U.S. PATENT DOCUMENTS

| | | | | |
|---|---|---|---|---|
| 8,660,072 B2 * | 2/2014 | Siomina et al. | ................ | 370/329 |
| 2008/0101488 A1 * | 5/2008 | Wilhelmsson et al. | ....... | 375/260 |
| 2009/0122927 A1 | 5/2009 | Walton et al. | | |
| 2010/0323693 A1 * | 12/2010 | Krishnamurthy et al. | ..... | 455/434 |
| 2014/0003262 A1 * | 1/2014 | He et al. | ......................... | 370/252 |
| 2014/0036708 A1 * | 2/2014 | Ou | .................................. | 370/252 |
| 2014/0274030 A1 * | 9/2014 | Aminzadeh et al. | .......... | 455/424 |
| 2014/0301303 A1 * | 10/2014 | Roman et al. | ................. | 370/329 |
| 2015/0078271 A1 * | 3/2015 | Kim et al. | ...................... | 370/329 |

OTHER PUBLICATIONS

ETSI TS 136 214, V8.6.0 LTE; Evolved Universal Terrestrial Radio Access (E-UTRA); Physical Layer Measurements (3GPP TS 36.214 Version 8.6.0, Release 8), Apr. 2009, pp. 1-15.

* cited by examiner

*Primary Examiner* — Hirdepal Singh
(74) *Attorney, Agent, or Firm* — Leffler Intellectual Property Law, PLLC; Kenneth B. Leffler (57) ABSTRACT

A Reference Signal Received Power (RSRP) value is produced from a received Orthogonal Frequency Division Multiplexed (OFDM) signal that comprises a plurality of reference symbols located at known sub-carrier frequencies and times within the received OFDM signal. RSRP value production involves, for each hypothesized error state selected from a plurality of different hypothesized error states, ascertaining a corresponding hypothesized RSRP value, and then using the hypothesized RSRP values as a basis for determining a value for use as the produced RSRP value (e.g., by selecting a maximum one of the hypothesized RSRP values as the produced RSRP value). In this technology, each of the hypothesized error states is a hypothesized frequency error paired with a hypothesized timing error and the corresponding hypothesized RSRP value is produced by adjusting one or more measured channel estimates as a function of the hypothesized error state.

16 Claims, 8 Drawing Sheets

CELLULAR COMMUNICATION SYSTEM COMPUTATION OF RSRP IN THE PRESENCE OF LARGE FREQUENCY ERRORS

BACKGROUND

The invention relates to technology for estimating Reference Signal Received Power (RSRP) in a cellular communication system, and more particularly to estimating RSRP in the presence of large Frequency errors.

Figure 1:
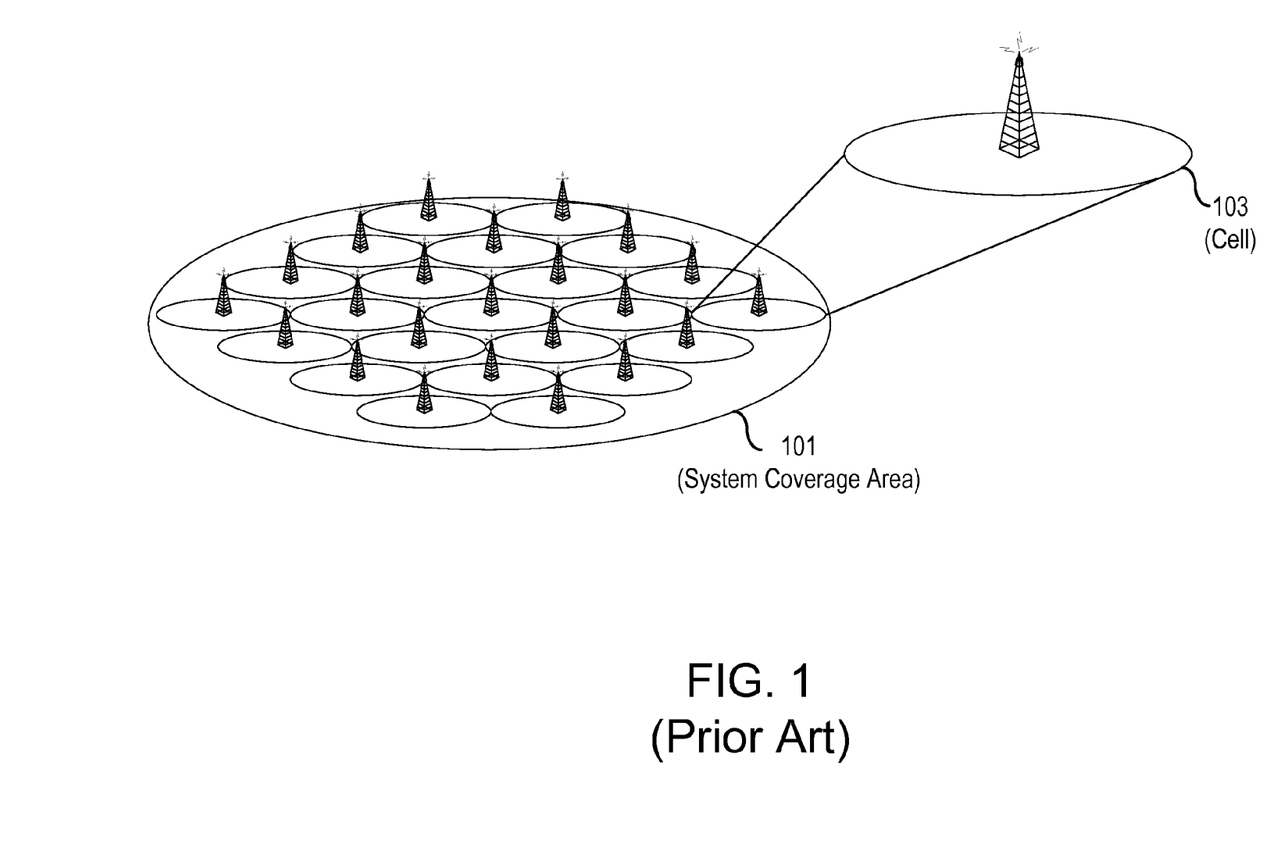
FIG. 1 illustrates a cellular communication system providing a system coverage area by means of a plurality of cells.

Cellular communication systems typically comprise a land-based network that provides wireless coverage to mobile terminals that can continue to receive service while moving around within the networks coverage area. The term "cellular" derives from the fact that the entire coverage area is divided up into so-called "cells", each of which is typically served by a particular radio transceiver station (or equivalent) associated with the land-based network. Such transceiver stations are often referred to as "base stations". As the mobile device moves from one cell to another, the network hands over responsibility for serving the mobile device from the presently-serving cell to the "new" cell. In this way, the user of the mobile device experiences continuity of service without having to reestablish a connection to the network. FIG. 1 illustrates a cellular communication system providing a system coverage area 101 by means of a plurality of cells 103.

In some of the newer mobile cellular standards, such as the so-called Long Term Evolution (LTE) standard, transmission techniques like Orthogonal Frequency Division Multiplexing (OFDM) are employed. An LTE-compliant system uses OFDM as the multiple access technique (called OFDMA) in the downlink and is able to operate on bandwidths ranging from 1.25 MHz to 20 MHz. Furthermore, very high data rates (e.g., up to 300 Mb/s in the downlink) are supported for the largest bandwidth. However, LTE is not limited to only high rate services, but is also usable for low rate services like voice. Since LTE is designed for Transmission Control Protocol/Internet Protocol (TCP/IP), Voice over IP (VoIP) is the service that carries speech.

There are several reasons why OFDM was chosen for the LTE system. One is that receiver complexity can be made relatively low. Another reason is that it, at least in theory, allows for very efficient usage of the available bandwidth. In case only one user is transmitting, it is possible to exploit that the channel quality typically is very different at different frequencies (in this respect, the channel is said to be "frequency selective"). Since the information in OFDM is transmitted on a large number of sub-carriers, different modulation and coding techniques can be applied on different sub-carriers, rather than using the same modulation and coding techniques on all sub-carriers. However, in order for this to be possible, the quality of the different sub-carriers of the channel (for instance the signal-to-noise-ratio) must be estimated and these estimates must be fed back to the transmitter.

In case several users are sharing the available bandwidth, the term orthogonal frequency division multiple access (OFDMA) is often used. In OFDMA, the sharing of the channel is achieved by allocating different sub-carriers to different users. The allocation of the sub-carriers to the different users can vary from one symbol to the next, so the channel is effectively divided in both time and frequency. Given a cellular system base station that serves several mobile stations, the channels from the base station to the different mobile stations vary differently and typically independently of one another. With respect to OFDMA, the idea of transmitting more information on the sub-carriers that have good quality, as described above, can be generalized in the following way. The quality on all sub-carriers for all users is determined. The base station then decides not only what the optimum modulation and coding techniques are, but also which sub-carriers should be allocated to which users.

An aspect of mobility in a cellular communication system is selection of a cell from a number of candidate cells, the selected cell being one that can best serve the User Equipment (UE). Measurement of the received signal strength from cells in the vicinity of the unity are fundamental for a proper working cell selection mechanism. RSRP measurements are used for this purpose.

RSRP measurement methodology is also defined by the system specifications, and in this regard 3GPP TS 36.214 version 8.6.0 Release 8 (2009-04) states that RSRP measurements should be estimated using Cell-specific Reference Symbols (CRS) on port 0 and possibly also on port 1 if port 1 is being used by eNodeB. The RSRP is typically computed as $$RSRP = P - bias \quad (1)$$

where $$P = \frac{1}{M} \sum_{m=1}^{M} \left| \frac{1}{N_S} \sum_{(k,l) \in S_m} H_{k,l} \right|^2 \quad (2)$$

$$RSSI = \frac{1}{M} \frac{1}{N_S} \sum_{m=1}^{M} \sum_{(k,l) \in S_m} |H_{k,l}|^2 \quad (3)$$

$$bias = \frac{N_S - 1}{N_S} (RSSI - P) \quad (4)$$

where $H_{k,l}$ is a channel estimate obtained for OFDM symbol l, and frequency index k by derotating the received symbols in the frequency domain for port 0 (i.e., by multiplying the received (rotated) pilot symbol by the conjugate of the known pilot symbol). The set $S_m$ is a set of $N_S$ CRS symbols (each CRS symbol being located at a particular frequency in a given symbol) over which the derotated symbols are averaged in order to reduce noise. This technique is sometimes also referred to as "coherent summation". The sets $S_m$ are enumerated using the index m. The set $S_m$ typically consists of all CRS symbols in a Resource Block (RB) and the number of sets $S_m$ could depend on the bandwidth. As a nonlimiting example, one could use M=6 for a bandwidth of 1.4 MHz.

The inventor of the subject matter defined herein has recognized a set of circumstances that make measuring RSRP problematic. In particular, it can be seen from the above equations that the RSRP is a function of terms that are themselves at least partly a function of frequency. However, when measuring RSRP on cells that are not part of the set of serving cells of the UE, frequency errors may arise due to timing errors resulting from the clocks between cells not being synchronized and lack of processing time in the UE to accurately measure the propagation delay profile of neighboring cells (as used herein, the term "timing errors" means the inability to accurately estimate the first path of the propagation channel that is to be measured, regardless of reason for that inability).

In the calculation of RSRP indicated above, the term that is especially sensitive to frequency and timing errors is the one that accumulates coherently the derotated CRS, that is the term $$\frac{1}{N_S} \sum_{(k,l) \in S_m} H_{k,l}.$$

It is possible to estimate the frequency error with good accuracy, but this conventionally involves receiving a fair amount of pilots (i.e., CRS's). Such extensive measurement usually takes longer than what a typical UE would want to allocate for measurement purposes.

The problem is even more acute for measurement on frequencies that are not used for data reception because it is desired to spend as little time as possible doing measurements on other frequencies, since time spent on other frequencies means less time for receiving data on the camping frequency.

It is therefore desirable to provide technology (e.g., methods and apparatuses) that enable measurement of RSRP relatively quickly and with good accuracy even in the presence of significant errors between eNodeB clocks, Doppler effects, and errors in determining the shape of the power delay profile (used to identify the start location of an OFDM symbol).

SUMMARY

It should be emphasized that the terms "comprises" and "comprising", when used in this specification, are taken to specify the presence of stated features, integers, steps or components; but the use of these terms does not preclude the presence or addition of one or more other features, integers, steps, components or groups thereof.

In accordance with one aspect of the present invention, the foregoing and other objects are achieved in methods and apparatuses for producing a Reference Signal Received Power (RSRP) value from a received Orthogonal Frequency Division Multiplexed (OFDM) signal that comprises a plurality of reference symbols located at known sub-carrier frequencies and times within the received OFDM signal. Producing the RSRP value comprises, for each hypothesized error state selected from a plurality of different hypothesized error states, ascertaining a corresponding hypothesized RSRP value, wherein each of the hypothesized error states is a hypothesized frequency error paired with a hypothesized timing error; and the corresponding hypothesized RSRP value is produced by adjusting one or more measured channel estimates as a function of the hypothesized error state. The hypothesized RSRP values are then used as a basis for determining a value for use as the produced RSRP value.

In some embodiments, using the hypothesized RSRP values as a basis for determining the value for use as the produced RSRP value comprises selecting a maximum one of the hypothesized RSRP values for use as the produced RSRP value.

In some alternative embodiments, using the hypothesized RSRP values as a basis for determining the value for use as the produced RSRP value comprises averaging a known number of highest hypothesized RSRP values to produce an average value, and using the average value as the produced RSRP value.

In an aspect of some embodiments, adjusting the one or more measured channel estimates as a function of the hypothesized error state comprises multiplying a frequency domain representation of the one or more measured channel estimates by an adjustment factor that satisfies:

$$e^{2\pi i \cdot \Delta t \cdot l} e^{2\pi i \cdot \Delta f \cdot k},$$

where:
  i represents the square root of −1;
  k is a frequency index of a reference symbol within the received OFDM signal for which the channel estimate was measured;
  l is an OFDM symbol index of the reference symbol for which the channel estimate was measured;
  Δf is a hypothesized frequency error; and
  Δt is a hypothesized timing error.

In an aspect of some alternative embodiments, adjusting the one or more measured channel estimates as a function of the hypothesized error state comprises multiplying a frequency domain representation of the one or more measured channel estimates by an adjustment factor that satisfies:

$$e^{2\pi i \cdot \Delta t \cdot \phi_t(l)} e^{2\pi i \cdot \Delta f \cdot \phi_f(k)},$$

where:
  i, k, l, Δf, and Δt are defined as stated above, and wherein $\phi_t(\ )$ is a function that models an irregularity of a frequency/time symbol grid in the time domain; and $\phi_f(\ )$ is a function that models an irregularity of the frequency/time symbol grid in the frequency domain.

In an aspect of some embodiments, adjusting the one or more measured channel estimates as a function of the hypothesized error state comprises measuring a channel estimate for each of a plurality of reference symbols having mutually different frequency and symbol indices within the received OFDM symbol. A plurality of adjusted channel estimates are then produced by adjusting each of the measured channel estimates as a function of the hypothesized error state. In an aspect of some of these embodiments, ascertaining a corresponding hypothesized RSRP value for the hypothesized error state comprises averaging the plurality of adjusted channel estimates.

In an aspect of some embodiments, the received OFDM signal is produced by receiving an OFDM signal from a non-serving cell in a cellular communication system.

BRIEF DESCRIPTION OF THE DRAWINGS

The objects and advantages of the invention will be understood by reading the following detailed description in conjunction with the drawings in which.

DETAILED DESCRIPTION

The various features of the invention will now be described with reference to the figures, in which like parts are identified with the same reference characters.

The various aspects of the invention will now be described in greater detail in connection with a number of exemplary embodiments. To facilitate an understanding of the invention, many aspects of the invention are described in terms of sequences of actions to be performed by elements of a computer system or other hardware capable of executing programmed instructions. It will be recognized that in each of the embodiments, the various actions could be performed by specialized circuits (e.g., analog and/or discrete logic gates interconnected to perform a specialized function), by one or more processors programmed with a suitable set of instructions, or by a combination of both. The term "circuitry configured to" perform one or more described actions is used herein to refer to any such embodiment (i.e., one or more specialized circuits and/or one or more programmed processors). Moreover, the invention can additionally be considered to be embodied entirely within any form of computer readable carrier, such as solid-state memory, magnetic disk, or optical disk containing an appropriate set of computer instructions that would cause a processor to carry out the techniques described herein. Thus, the various aspects of the invention may be embodied in many different forms, and all such forms are contemplated to be within the scope of the invention. For each of the various aspects of the invention, any such form of embodiments as described above may be referred to herein as "logic configured to" perform a described action, or alternatively as "logic that" performs a described action.

Figure 2:
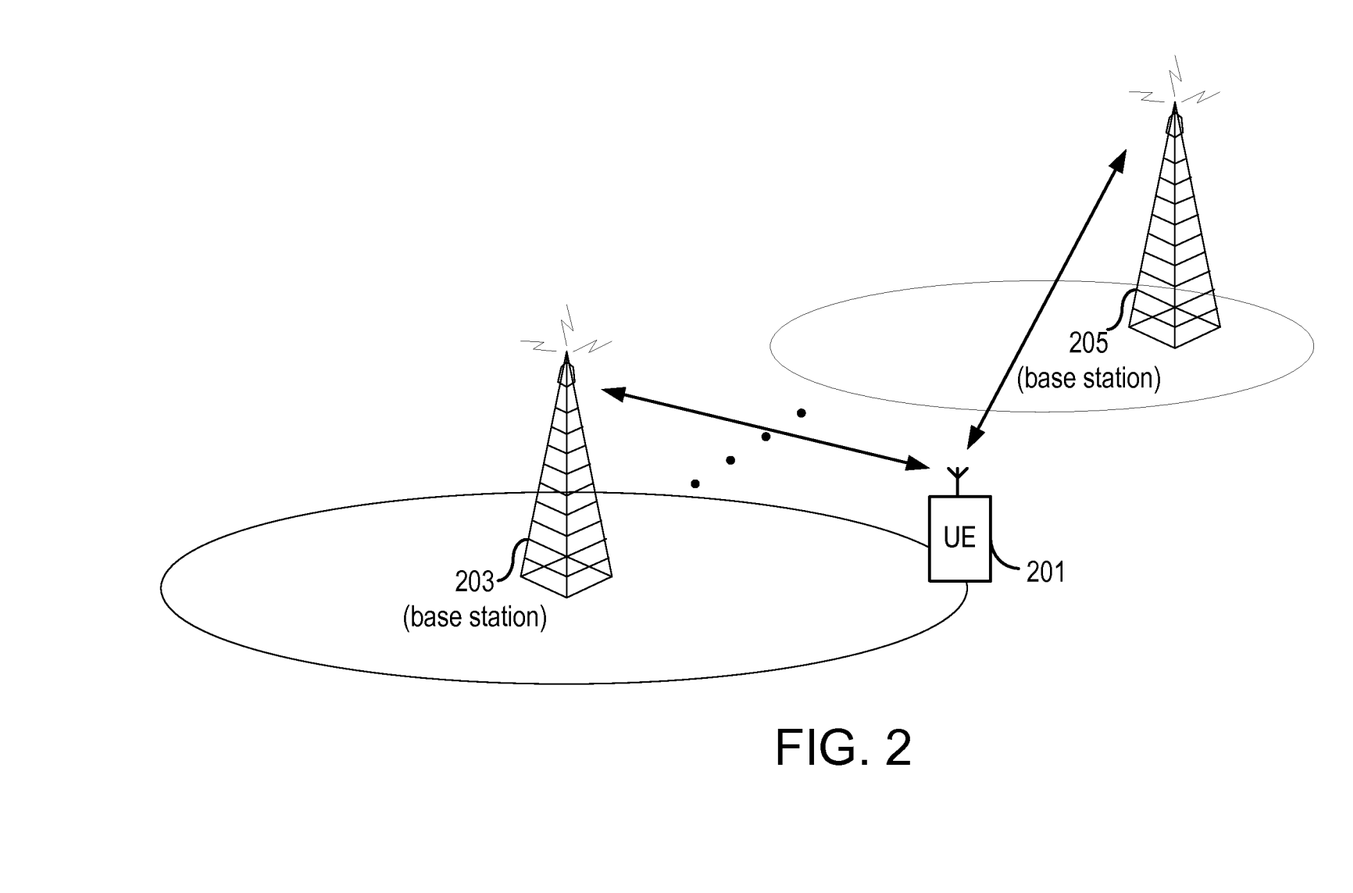
FIG. 2 illustrates a UE operating in a cellular communication system comprising a number of base stations including first and second base stations.

FIG. 2 illustrates a UE 201 operating in a cellular communication system. The UE 201 at various times performs an RSRP measurement to keep apprised of what base stations are nearby and of their signal quality so that cell selection decisions can be made. For purposes of illustration, the base stations are illustrated in FIG. 2 by a first base station 203 and a second base station 205. However, the number of nearby base stations can be more or fewer than the two that are illustrated. The UE 201 may, for example, be camped on one of the base stations 203, 205 at the time of making its measurements on one or both of the base stations 203, 205.

As this technology deals extensively with the format of received signals, and especially of CRS's, these will be discussed in the following. To facilitate the reader's understanding of the variously described features, the terminology and features associated with an LTE system are used. However, this is done only for the purpose of example, and is not intended to suggest that the various embodiments consistent with the invention are usable only in an LTE system. To the contrary, the various embodiments consistent with the invention are usable in any comparable communication system that presents the same problem as a conventional LTE system (e.g., needing to make an RSRP or comparable measurement based on signals that have been subjected to frequency errors) and provides the ability to allocate resources in a way that is comparable to a conventional LTE system.

Figure 3:
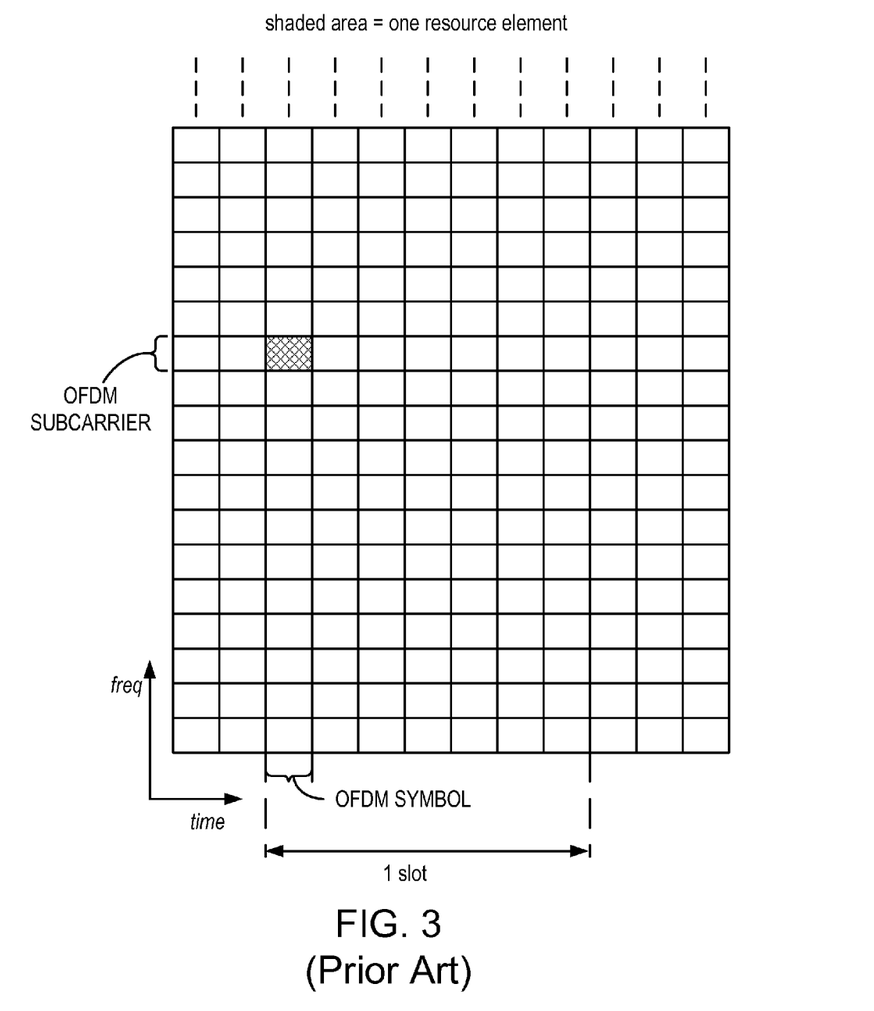
FIG. 3 illustrates a time-frequency grid an exemplary LTE downlink physical resource ("resource element") that corresponds to one OFDM subcarrier during one OFDM symbol interval.

The LTE physical layer downlink transmission is based on OFDM. The basic LTE downlink physical resource can thus be seen as a time-frequency grid as illustrated in FIG. 3, in which each so-called "resource element" corresponds to one OFDM subcarrier during one OFDM symbol interval.

Figure 4:
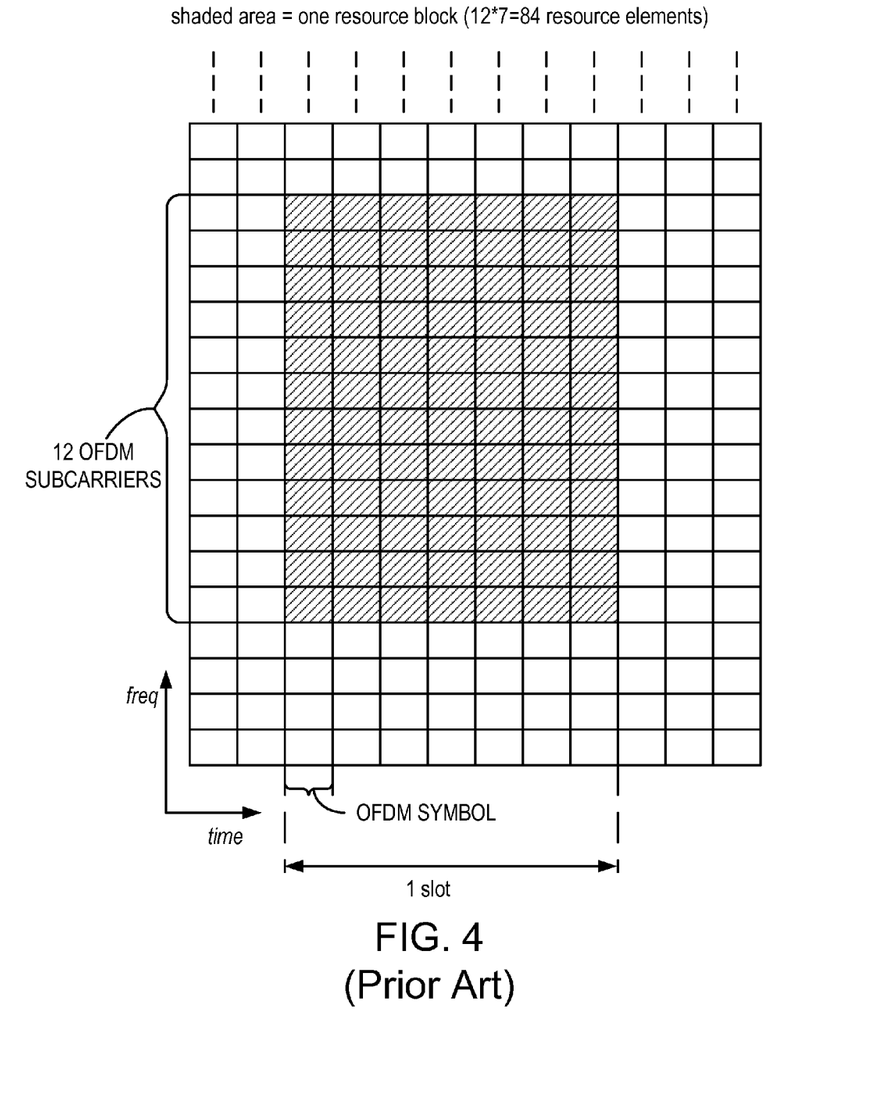
FIG. 4 is a time-frequency grid illustrating how downlink subcarriers in the frequency domain are grouped into resource blocks.

As illustrated in FIG. 4, the downlink subcarriers in the frequency domain are grouped into resource blocks (RBs), where each resource block consists of twelve subcarriers for a duration of one 0.5 ms slot (7 OFDM symbols when normal cyclic prefixes are used (as illustrated) or 6 OFDM symbols when extended cyclic prefixes are used), corresponding to a nominal resource-block bandwidth of 180 kHz.

The total number of downlink subcarriers, including a DC-subcarrier, thus equals $N_c=12 \cdot N_{RB}+1$ where $N_{RB}$ is the maximum number of resource blocks that can be formed from the $12 \cdot N_{RB}$ usable subcarriers. The LTE physical-layer specification actually allows for a downlink carrier to consist of any number of resource blocks, ranging from $N_{RB-min}=6$ and upwards, corresponding to a nominal transmission bandwidth ranging from 1.4 MHz up to 20 MHz. This allows for a very high degree of LTE bandwidth/spectrum flexibility, at least from a physical-layer-specification point-of-view.

Figure 5:
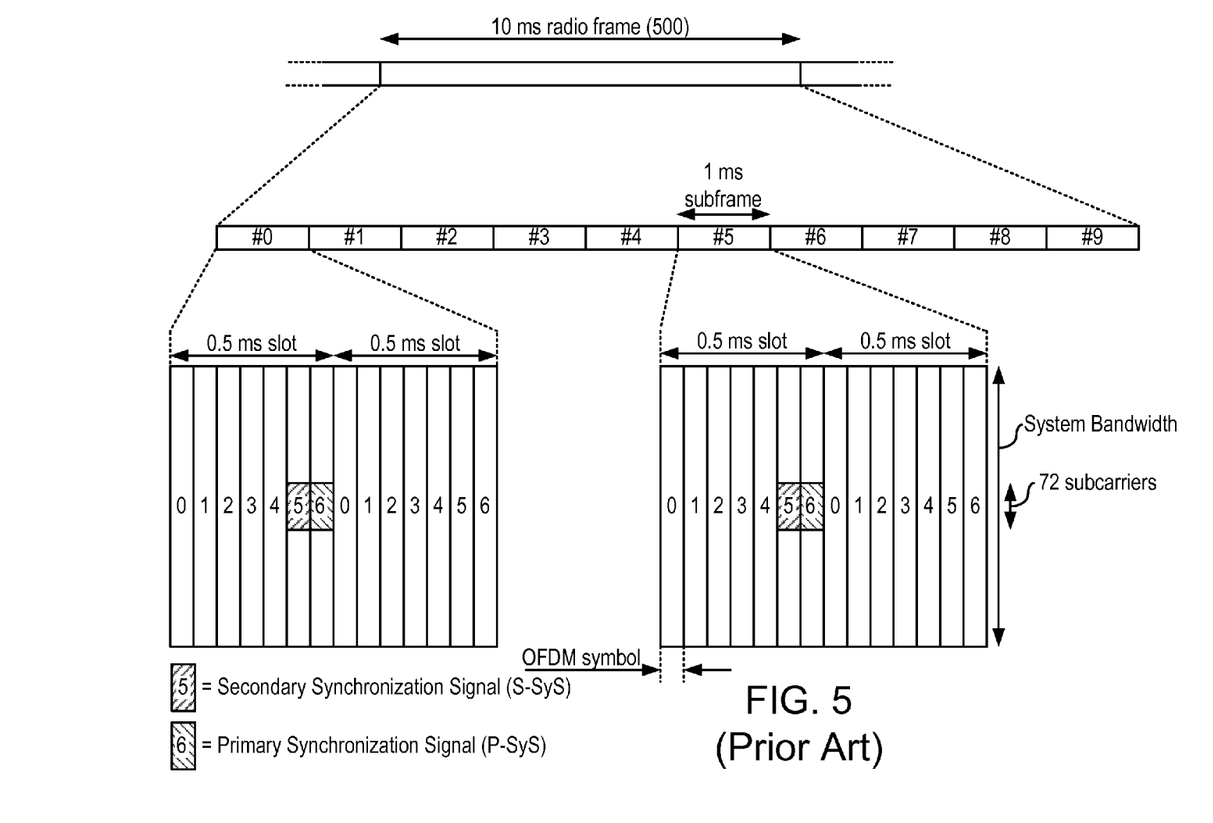
FIG. 5 illustrates the structure of the radio interface of an LTE system.

FIG. 5 shows the structure of the radio interface of an LTE system. The physical layer of an LTE system includes a generic radio frame 500 having a duration of 10 ms. FIG. 5 illustrates one such frame 500 for an LTE Frequency Division Duplex (FDD) system. Each frame has 20 slots (numbered 0 through 19), each slot having a duration of 0.5 ms which normally consists of seven OFDM symbols. A subframe is made up of two adjacent slots, and therefore has a duration of 1 ms, normally consisting of 14 OFDM symbols. The primary and secondary synchronization signals are specific sequences, inserted into the last two OFDM symbols in the first slot of each of subframes 0 and 5. The primary synchronization signal can occupy less bandwidth than does the secondary synchronization signal. In addition to the synchronization signals, part of the operation of the cell search procedure also exploits reference signals that are transmitted at known locations in the transmitted signal.

Figure 6:
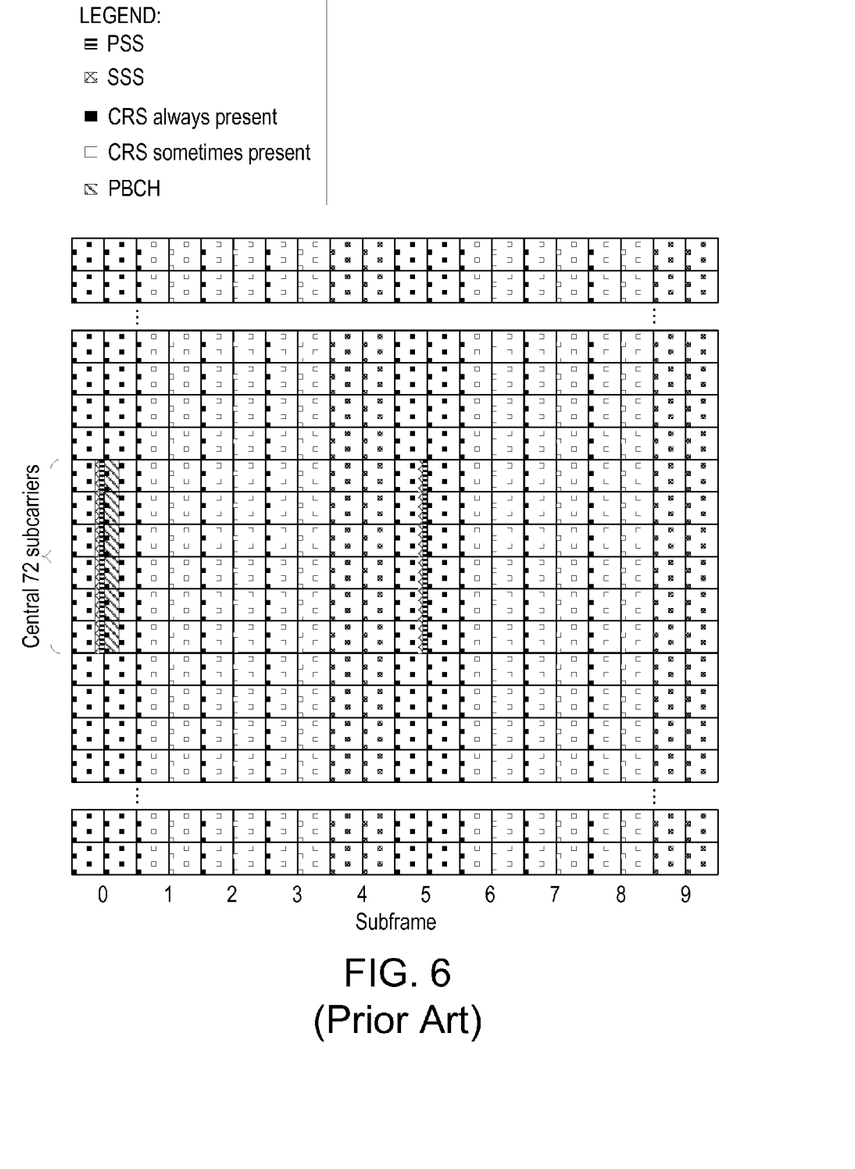
FIG. 6 is a depiction of the structure of the radio interface (time-frequency grid) of a legacy LTE system.

FIG. 6 is another depiction of the structure of the radio interface (time-frequency grid) of a legacy LTE FDD cell. It can be seen that the radiofrequency spectrum allocated to the legacy LTE FDD cell is wider than the smallest downlink system bandwidth of 1.4 MHz (72 subcarriers or 6 RBs). Subframes 1-3 and 6-8 may be used for MBSFN or may be signaled to be used for other purposes, in which case a UE cannot expect reference signals in more than the first OFDM symbol interval. (To avoid cluttering the figure, it does not show each of the OFDM symbol intervals within each subframe.) The Physical Broadcast Channel (PBCH) (carrying the Master Information Block—"MIB") and synchronization signals are transmitted at prior known OFDM symbol positions over the central 72 subcarriers.

The technology described herein enables measurement of RSRP relatively quickly and with good accuracy even in the presence of significant frequency error. The approach taken is to calculate a candidate RSRP value for each one of a set of hypothetical frequency and timing error pairs (i.e., each element of the set consists of a hypothesized frequency error paired with a hypothesized timing error). The candidate RSRP values are compared against each other and a most accurate value is determined and used as the reported RSRP. Different embodiments can employ different techniques to ascertain what constitutes a "most accurate' RSRP to be reported. In some embodiments, this involves selecting a maximum RSRP value from among the candidate RSRP values. Alternatively, in situations involving a lot of noise in the system, selecting the maximum RSRP may not produce the optimal RSRP estimation, since the technology is then trying to fit against noise. In practice, this effect is negligible, but if it is necessary to measure in very noisy environments a better approach involves averaging some known number (e.g., 3 or 4) of the "best" (i.e., highest valued) candidate RSRP values and using the average value as the reported RSRP value. This technology is described in greater detail in the following. In an exemplary embodiment consistent with the invention, the RSRP is still computed in accordance with Equation 1, but instead of using the conventional approach, a value of P is obtained in accordance with:

$$P = \max_{(\Delta t, \Delta f) \in J} \frac{1}{M} \sum_{m=1}^{M} \left| \frac{1}{N_S} \sum_{(k,l) \in S_m} e^{2\pi i \cdot \Delta t \cdot l} e^{2\pi i \cdot \Delta f \cdot k} H_{k,l} \right|^2 \quad (5)$$

where i represents the square root of −1, and J are a finite set of hypothesized error states, with each hypothesized error state consisting of a hypothesized frequency error (Δf) paired with a hypothesized timing error (Δt). The timing errors will result in a rotation along the frequency direction which is counterbalanced by the factor $e^{2\pi i \cdot \Delta t \cdot l}$. The frequency errors will result in a rotation in the time direction which is counterbalanced by the factor $e^{2\pi i \cdot \Delta f \cdot k}$.

In equation (5) it is assumed that the spacing between the grid points in frequency and time direction are regular. This assumption holds true for LTE-type systems. In the more general case, however, the spacing is not assumed to be regular and appropriate adjustment factors are therefore incorporated into the exponents of $e^{2\pi i \cdot \Delta t \cdot l}$ and $e^{2\pi i \cdot \Delta f \cdot k}$. In such embodiments, a value of P is obtained in accordance with:

$$P = \max_{(\Delta t, \Delta f) \in J} \frac{1}{M} \sum_{m=1}^{M} \left| \frac{1}{N_S} \sum_{(k,l) \in S_m} e^{2\pi i \cdot \Delta t \cdot \varphi_t(l)} e^{2\pi i \cdot \Delta f \cdot \varphi_f(k)} H_{k,l} \right|^2 \quad (5')$$

where the function $\varphi_t(\ )$ models the irregularity of the symbol grid in the time domain, and the function $\varphi_f(\ )$ models the irregularity of the symbol grid in the frequency domain. Equations (5) and (5') are related in that, for a regular grid, one has $$\varphi_t(k) = k \quad (6a)$$

$$\varphi_f(l) = l \quad (6b)$$

Thus, in embodiments in which equations (6a) and (6b) are true, the more general equation (5') reduces to equation (5).

As a non-limiting example, when the set $S_m$ consists of all CRS symbols in a resource block, a useful embodiment can involve five frequency hypotheses corresponding to
  −1000 Hz, −500 Hz, 0 Hz, 500 Hz, 1000 Hz
and two hypotheses for the timing error corresponding to −1 and 0 chip offsets.

Figure 7:
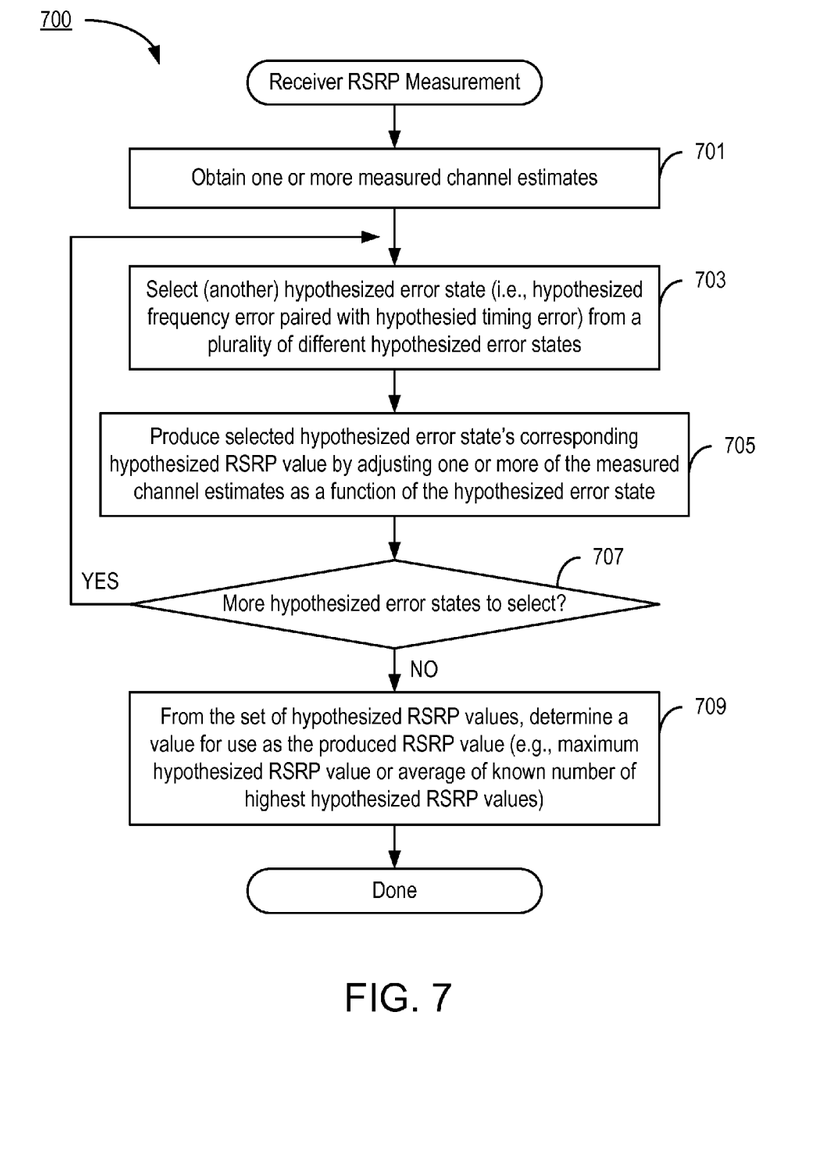
FIG. 7 is, in one respect, a flow chart of steps/processes performed by a receiver to produce an RSRP measurement in accordance with some but not necessarily all exemplary embodiments of the invention.

To further illustrate aspects of embodiments consistent with exemplary embodiments of the invention, FIG. 7 is, in one respect, a flow chart of steps/processes performed by a receiver (e.g., the receiver 200) in accordance with some but not necessarily all exemplary embodiments of the invention. In another respect, FIG. 7 can be considered to depict exemplary means 700 comprising the various illustrated circuitry (e.g., hard-wired and/or suitably programmed processor) configured to perform the described functions. In the illustrated embodiment, the receiver's task is to produce an RSRP value from a received OFDM signal that comprises a plurality of reference symbols located at known sub-carrier frequencies and times within the received OFDM signal. Processes consistent with the invention obtain one or more measured channel estimates by means of any known methodology/technology (step 701). A set of a plural number of hypothesized error states (i.e., each hypothesized error state being a unique pairing of one of a number of hypothesized frequency errors paired with one of a number of hypothesized timing errors) is made available to the receiver (e.g., by being pre-stored), and the receiver generates a corresponding hypothesized RSRP value for each of the hypothesized error states. For example, in embodiments that perform this serially in a loop (not an essential feature), the receiver selects one of the hypothesized error states from the set (step 703) and produces the selected hypothesized error state's corresponding hypothesized RSRP value by adjusting the one or more measured channel estimates as a function of the hypothesized error state (step 705). For example, the adjustment can be made as illustrated above in either of Equations (5) or (5'). More particularly, adjusting the one or more measured channel estimates as a function of the hypothesized error state can comprise multiplying a frequency domain representation of the one or more measured channel estimates by an adjustment factor that satisfies:

$$e^{2\pi i \cdot \Delta t \cdot l} e^{2\pi i \cdot \Delta f \cdot k},$$

where:
  i represents the square root of −1;
  k is a frequency index of a reference symbol within the received OFDM signal for which the channel estimate was measured;
  l is an OFDM symbol index of the reference symbol for which the channel estimate was measured;
  Δf is a hypothesized frequency error; and
  Δt is a hypothesized timing error.

If there are more hypothesized error states to select ("YES" path out of decision block 707), then process reverts back to step 703 at which another one of the hypothesized error states is selected.

At some point, all of the hypothesized error states will have been selected and had a corresponding hypothesized RSRP value produced, at which point there will be no more hypothesized error states to select ("NO" path out of decision block 707). When this point is reached, the hypothesized RSRP values are used as a basis for determining a value for use as the produced RSRP value (step 709).

Selection of one of the hypothesized RSRP values for use as the produced RSRP value can, for example, be based on which one of the hypothesized RSRP values is a maximum one of the values.

Alternatively, a known (e.g., predetermined) number of highest hypothesized RSRP values can be used as the produced RSRP value. As mentioned earlier, this approach is especially useful in noisy environments.

In an aspect of some embodiments, adjusting the one or more measured channel estimates as a function of the hypothesized error state (illustrated in step 705) involves measuring a channel estimate for each of a plurality of reference symbols having mutually different frequency and symbol indices within the received OFDM symbol, and producing a plurality of adjusted channel estimates by adjusting each of the measured channel estimates as a function of the hypothesized error state. In such embodiments, ascertaining a corresponding hypothesized RSRP value for the hypothesized error state can comprise averaging the plurality of adjusted channel estimates.

Figure 8:
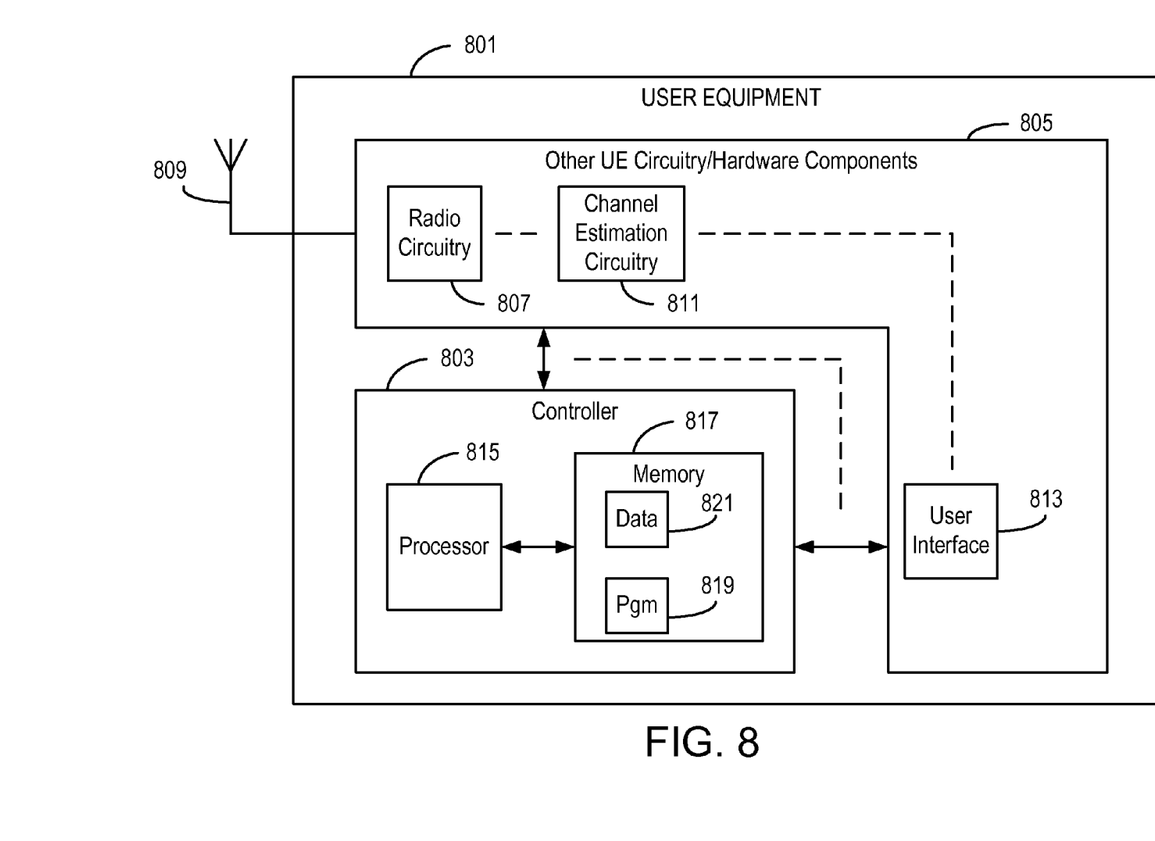
FIG. 8 is a block diagram of an exemplary receiver that operates in accordance with various aspects described herein to produce an RSRP measurement.

FIG. 8 is a block diagram of an exemplary receiver 801 that operates in accordance with various aspects described above, for example, with respect to FIG. 7. The receiver 801 includes a controller 803 coupled to other User Equipment (UE) circuitry/hardware components 805 that enable the communication device 801 to operate as a communication device. The other UE circuitry/hardware components 805 are generally known in the art, and may include such elements as, for example and without limitation, radio circuitry 807 coupled to one or more antennas 809. The other UE circuitry/hardware 805 may also include channel estimation circuitry 811 and some sort of user interface (e.g., display, keyboard, switch(es)) 813, although applications that call for use of a low cost/low power communication device may have very simplistic needs for a user interface 813 (e.g., a reset switch) or none at all.

The controller 803 includes circuitry configured to carry out any one or any combination of the RSRP measurement aspects described above with respect to device actions. Such circuitry could, for example, be entirely hard-wired circuitry (e.g., one or more ASICs). Depicted in the exemplary embodiment of FIG. 8, however, is programmable circuitry, comprising a processor 815 coupled to one or more memory devices 817 (e.g., Random Access Memory, Magnetic Disc Drives, Optical Disk Drives, Read Only Memory, etc.). The memory device(s) store program means 819 (e.g., a set of processor instructions) configured to cause the processor 815 to control the other UE circuitry/hardware components 805 so as to carry out any of the device-related aspects described above, such as with respect to FIG. 7. The memory 817 may also store data 821 representing various constant and variable parameters as may be needed by the processor 815 (e.g., a set of hypothesized error states) when carrying out its functions such as those specified by the program means 819.

Embodiments employing the technological aspects illustrated above are advantageous in that they are able to produce RSRP values without spending valuable time accurately estimating the timing and frequency errors for a cell part of the measurement set.

The invention has been described with reference to particular embodiments. However, it will be readily apparent to those skilled in the art that it is possible to embody the invention in specific forms other than those of the embodiment described above. Accordingly, the described embodiments are merely illustrative and should not be considered restrictive in any way. The scope of the invention is given by the appended claims, rather than the preceding description, and all variations and equivalents which fall within the range of the claims are intended to be embraced therein.

What is claimed is:

1. A method of producing a Reference Signal Received Power (RSRP) value from a received Orthogonal Frequency Division Multiplexed (OFDM) signal that comprises a plurality of reference symbols located at known sub-carrier frequencies and times within the received OFDM signal, the method comprising:
   for each hypothesized error state selected from a plurality of different hypothesized error states, ascertaining a corresponding hypothesized RSRP value, wherein:
      each of the hypothesized error states is a hypothesized frequency error paired with a hypothesized timing error; and
      the corresponding hypothesized RSRP value is produced by adjusting one or more measured channel estimates as a function of the hypothesized error state; and
   using the hypothesized RSRP values as a basis for determining a value for use as the produced RSRP value.

2. The method of claim 1, wherein using the hypothesized RSRP values as a basis for determining the value for use as the produced RSRP value comprises selecting a maximum one of the hypothesized RSRP values for use as the produced RSRP value.

3. The method of claim 1, wherein using the hypothesized RSRP values as a basis for determining the value for use as the produced RSRP value comprises averaging a known number of highest hypothesized RSRP values to produce an average value, and using the average value as the produced RSRP value.

4. The method of claim 1, wherein adjusting the one or more measured channel estimates as a function of the hypothesized error state comprises multiplying a frequency domain representation of the one or more measured channel estimates by an adjustment factor that satisfies:

$$e^{2\pi i \cdot \Delta t \cdot l} e^{2\pi i \cdot \Delta f \cdot k},$$

where:
   i represents the square root of −1;
   k is a frequency index of a reference symbol within the received OFDM signal for which the channel estimate was measured;
   l is an OFDM symbol index of the reference symbol for which the channel estimate was measured;
   Δf is a hypothesized frequency error; and
   Δt is a hypothesized timing error.

5. The method of claim 1, wherein adjusting the one or more measured channel estimates as a function of the hypothesized error state comprises multiplying a frequency domain representation of the one or more measured channel estimates by an adjustment factor that satisfies:

$$e^{2\pi i \cdot \Delta t \cdot \phi_t(l)} e^{2\pi i \cdot \Delta f \cdot \phi_f(k)},$$

where:
   i represents the square root of −1;
   k is a frequency index of a reference symbol within the received OFDM signal for which the channel estimate was measured;
   l is an OFDM symbol index of the reference symbol for which the channel estimate was measured;
   Δf is a hypothesized frequency error;
   Δt is a hypothesized timing error;
   $\phi_t(\ )$ is a function that models an irregularity of a frequency/time symbol grid in the time domain; and
   $\phi_f(\ )$ is a function that models an irregularity of the frequency/time symbol grid in the frequency domain.

6. The method of claim 1, wherein adjusting the one or more measured channel estimates as a function of the hypothesized error state comprises:
   measuring a channel estimate for each of a plurality of reference symbols having mutually different frequency and symbol indices within the received OFDM symbol; and
   producing a plurality of adjusted channel estimates by adjusting each of the measured channel estimates as a function of the hypothesized error state.

7. The method of claim 6, wherein ascertaining a corresponding hypothesized RSRP value for the hypothesized error state comprises:
   averaging the plurality of adjusted channel estimates.

8. The method of claim 1, comprising:
   receiving the OFDM signal from a non-serving cell in a cellular communication system to produce the received OFDM signal.

9. An apparatus for producing a Reference Signal Received Power (RSRP) value from a received Orthogonal Frequency Division Multiplexed (OFDM) signal that comprises a plurality of reference symbols located at known sub-carrier frequencies and times within the received OFDM signal, the apparatus comprising:
   circuitry configured to ascertain, for each hypothesized error state selected from a plurality of different hypothesized error states, a corresponding hypothesized RSRP value, wherein:

each of the hypothesized error states is a hypothesized frequency error paired with a hypothesized timing error; and the corresponding hypothesized RSRP value is produced by adjusting one or more measured channel estimates as a function of the hypothesized error state; and circuitry configured to use the hypothesized RSRP values as a basis for determining a value for use as the produced RSRP value.

10. The apparatus of claim 9, wherein the circuitry configured to use the hypothesized RSRP values as a basis for determining the value for use as the produced RSRP value comprises circuitry configured to select a maximum one of the hypothesized RSRP values for use as the produced RSRP value.

11. The apparatus of claim 9, wherein the circuitry configured to use the hypothesized RSRP values as a basis for determining the value for use as the produced RSRP value comprises circuitry configured to average a known number of highest hypothesized RSRP values to produce an average value, and to use the average value as the produced RSRP value.

12. The apparatus of claim 9, wherein adjusting the one or more measured channel estimates as a function of the hypothesized error state comprises multiplying a frequency domain representation of the one or more measured channel estimates by an adjustment factor that satisfies:

$$e^{2\pi i \cdot \Delta t \cdot l} e^{2\pi i \cdot \Delta f \cdot k},$$

where:
i represents the square root of −1;
k is a frequency index of a reference symbol within the received OFDM signal for which the channel estimate was measured;
l is an OFDM symbol index of the reference symbol for which the channel estimate was measured;
Δf is a hypothesized frequency error; and
Δt is a hypothesized timing error.

13. The apparatus of claim 9, wherein adjusting the one or more measured channel estimates as a function of the hypothesized error state comprises multiplying a frequency domain representation of the one or more measured channel estimates by an adjustment factor that satisfies:

$$e^{2\pi i \cdot \Delta t \cdot \phi_t(l)} e^{2\pi i \cdot \Delta f \cdot \phi_f(k)},$$

where
i represents the square root of −1;
k is a frequency index of a reference symbol within the received OFDM signal for which the channel estimate was measured;
l is an OFDM symbol index of the reference symbol for which the channel estimate was measured;
Δf is a hypothesized frequency error;
Δt is a hypothesized timing error;
$\phi_t(\ )$ is a function that models an irregularity of a frequency/time symbol grid in the time domain; and
$\phi_f(\ )$ is a function that models an irregularity of the frequency/time symbol grid in the frequency domain.

14. The apparatus of claim 9, wherein adjusting the one or more measured channel estimates as a function of the hypothesized error state comprises:

measuring a channel estimate for each of a plurality of reference symbols having mutually different frequency and symbol indices within the received OFDM symbol; and producing a plurality of adjusted channel estimates by adjusting each of the measured channel estimates as a function of the hypothesized error state.

15. The apparatus of claim 14, wherein the circuitry configured to ascertain a corresponding hypothesized RSRP value for the hypothesized error state comprises:

circuitry configured to average the plurality of adjusted channel estimates.

16. The apparatus of claim 9, comprising:

circuitry configured to receive the OFDM signal from a non-serving cell in a cellular communication system to produce the received OFDM signal.

\* \* \* \* \*